Sept. 21, 1971 V. SPRETER ET AL Re. 27,180
IMPRINTING AND OBLITERATING APPARATUS
Original Filed July 6, 1966
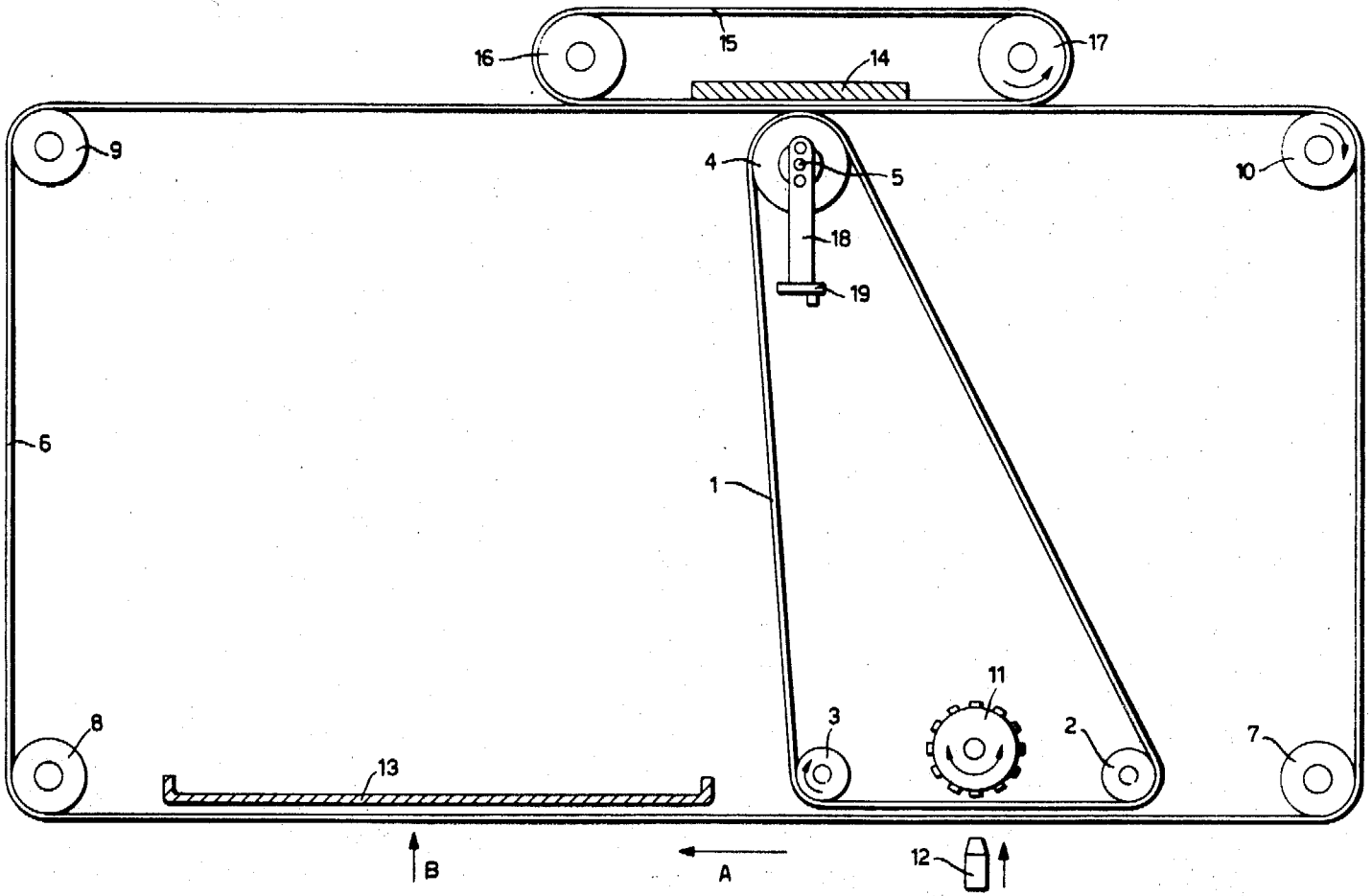
INVENTORS
VICTOR SPRETER
MAX SCHONFELDER
BY Bacon & Thomas
ATTORNEYS United States Patent Office Re. 27,180
Reissued Sept. 21, 1971

27,180

IMPRINTING AND OBLITERATING APPARATUS

Victor Spreter, Geneva, and Max Schonfelder, Petit-Lancy, Geneva, Switzerland, assignors to Ing. C. Olivetti & C., S.p.A., Ivrea, Italy Original No. 3,421,611, dated Jan. 14, 1969, Ser. No. 563,130, July 6, 1966. Application for reissue May 11, 1970, Ser. No. 36,193
Claims priority, application Switzerland, July 8, 1965, 9,692/65
Int. Cl. B41z *1/32*
U.S. Cl. 197—49 9 Claims

Matter enclosed in heavy brackets [ ] appears in the original patent but forms no part of this reissue specification; matter printed in italics indicates the additions made by reissue.

ABSTRACT OF THE DISCLOSURE

A printing device is provided which ink prints with a non-diffusible endless inking ribbon onto an endless plastic band of polyester resin, such as polyethylene terephthalate, and then at a later station, after passing reading position, rubs the same inking ribbon over the plastic band to effect obliteration and reabsorption of the ink imprint back onto the inking ribbon.

This invention relates to an apparatus for visibly imprinting, especially by impact printing, an inscription base cooperating with an inking ribbon, and for successively obliterating the inscription in a re-usable way.

It is known that impact printing by means of an inking ribbon on a paper sheet is generally carried out in such a way that ink permeates the paper. Such a paper writing base is usable just once.

Stencil writing bases are also known, which are made of paper covered with paraffin to permit reproduction of impact imprinted inscriptions. By using such writing bases, obliteration of the inscription can be effected by means of a suitable solvent, but a repeated re-use of the writing base cannot be achieved in practice.

Re-usable writing bases, by which a temporary inscription is obtainable, have already been proposed, wherein a transparent sheet is briefly forced into contact with a sheet coated on one side with a waxy layer. However, such writing bases are subject to rapid deterioration and are not advantageously employable in impact printing systems.

It is a chief object of the invention to provide an apparatus for visibly imprinting, especially by an impacting force, a transparent sheet assembled to an inking ribbon, and for successively obliterating the inscription in a re-usable way. Other objects of the present invention will become more apparent from the following detailed description and appended claims.

According to the present invention, an imprinting and obliterating apparatus is proposed, comprising: an inking ribbon having absorbed thereto a non-diffusible ink; an inscription base having at least a smooth surface not permeable by said ink; inscription means for forcing into contact said inking ribbon and said smooth surface for transferring ink to said base to make a visible impression thereon; and obliterating means consisting of an elastic member engaging a small area of said ribbon and applying said area under a given pressure against the part of said surface carrying said visible impressions, and means imparting an oscillatory movement to said elastic member for rubbing said area against said part of said surface to reabsorb said transferred ink.

The invention is described in greater detail by reference to the single figure of the drawing which is a schematic view of an apparatus embodying the invention.

A preferred imprinting and obliterating apparatus embodying the invention comprises an endless inking ribbon 1 passing around the guide roll 2, the driving roll 3 and the obliterator roll 4 which is made of spongy caoutchouc and is mounted on axis 5. The inking ribbon 1 contains absorbed thereto a non-diffusable ink, i.e. a non-percolating one.

The guide rolls 7, 8 and 9 and the driving roll 10 engage an endless transparent band 6 of hard plastic material, e.g. of a polyester such as polyethylene terephthalate, which serves as the inscription base. As shown in the drawing, roll 4 as well as rolls 2, 3 and 7 to 10 are arranged so that the bands 1 and 6 each show a rectilinear portion passing across two imprinting members, one of which is the type-carrying member 11 facing the inking ribbon 1, and the other the platen member 12 facing the band 6.

Control means of a conventional type and therefore not shown in the drawing are employed for activating the imprinting members 11 and 12 as well as for the driving rolls 3 and 10.

The driving rolls 3 and 10 both assure the transport of bands 6 and 1 in the direction of arrow A. The control of the driving rolls 3 and 10 is connected to the control of the imprinting members 11 and 12 in such a way that both bands are advanced a given length during the time comprised between two following imprinting operations.

Inscription is effected by forcing into contact bands 6 and 1 against a preselected symbol of the type-carrying member 11 by means of the platen member 12.

In order to facilitate the reading of the visible impression thus deposited on the inner surface of band 6, this band is then conveyed, as indicated by arrow B, through a light-coloured reading screen 13 which produces a clear contrast for the ink deposited from band 1.

Regeneration of the imprinted transparent sheet forming the band 6 is effected by placing it again into contact with the inking ribbon 1 by means of the obliterator roll 4 which presses band 6, under a given pressure, against a support member 14.

An auxiliary endless band 15 made of plastic material and conveyed by roll 17 and guide roll 16 is passed across the support member 14 and band 6. This auxiliary band 15 is advanced in synchronism with band 6 in order to avoid any rubbing on the outer face of the latter. The axis 5 of the obliterating roll 4 is removably mounted into one of three possible positions of the bearing arm 18, thus allowing the distance between the axis of roll 4 and the support member 14 to be varied in order to properly adjust the contact pressure of roll 4 against band 6.

An eccentric member 19 controlled by means not shown in the drawing co-operates with the bearing arm 18 to impart to it, and consequently to roll 4, an oscillatory, e.g. a circular movement. The rubbing of band 1 against band 6 due to said vibratory movement of roll 4 causes reabsorption by band 1 of the ink deposited on band 6 and, therefore, obliteration of the visible impressions and recovery of the deposited ink.

According to the experience it has been demonstrated that the above described device permits 300 characters per minute to be easily imprinted and obliterated, when the circular movement of the obliterating roll has a frequency of about 100 r.p.m. A very satisfactory obliteration is obtained when the contact pressure of band 6 against band 1 is in the range from about 4 to 6 p.s.i.

The reading screen 13 is provided with grooves (not shown in the drawing) for guiding the edges of band 6, thus avoiding direct contact of the inscription with the screen and its consequent obliteration.

Depending on the structure and function of the apparatus which the device of the present invention has to be employed, modifications may be devised, especially with regard to the form and the structure of the inscription band. It is thus apparent that the band can be formed of any suitable material having the properties required by the invention, namely, a smooth surface not permeable by ink, e.g. a glass surface, a metal surface etc.

The inscription base will be a transparent one only in the case where a reading of the inscription through the base is desired.

Furthermore, the number of the obliterating members and their rubbing movement will depend on the desired inscription speed.

This rubbing movement can be other than a circular one, e.g. any other oscillatory or vibratory movement. It has to be noted that roll 4, other than of spongy caoutchouc, can be formed of any sufficiently elastic material such as a usual caoutchouc, a spongy polyurethane composition, etc.

The inking ribbon may be given the form of a Mobius tape to allow both its faces to be utilized.

It is apparent from the above description that the apparatus of the invention can be employed by using any known ink-transfer inscription methods other than the impact printing method.

It is intended that modifications, improvements and additions of parts may be made to the described apparatus without departing from the scope of the invention as defined by the appended claims.

We claim:

1. An imprinting and obliterating apparatus, comprising:

(a) an inking ribbon having absorbed thereto a non-diffusible ink, (b) an inscription base having at least a smooth surface not permeable by said ink, (c) inscription means for forcing into contact said ribbon and said smooth surface for transferring ink to said base to make a visible impression thereon, (d) and obliterating means for rubbing at least a small area of said ribbon against the part of said surface carrying said visible impressions to reabsorb said transferred ink.

2. An imprinting and obliterating apparatus, comprising:

(a) an inking ribbon having absorbed thereto a non-diffusable ink, (b) an inscription base having at least a smooth surface not permeable by said ink, (c) inscription means for forcing into contact said ribbon and said surface for transferring ink to said base to make visible impressions thereon, (d) an elastic member engaging a small area of said ribbon and applying said area under a given pressure against the part of said surface carrying said visible impressions, and (e) means for imparting an oscillatory movement to said elastic member for rubbing said area against said part of said surface to reabsorb said transferred ink.

3. An apparatus as claimed in claim 2, wherein said inscription means comprise a type-carrying member facing said ribbon and a platen member facing said base.

4. An apparatus as claimed in claim 2, wherein said rubbing movement of said ribbon is a circular movement.

5. An apparatus as claimed in claim 2, wherein said elastic member is a guide roll for said ribbon, means being provided for controlling the distance between the rotation axis of said guide roll and said base.

6. An apparatus as claimed in claim 2, wherein said elastic member is made of spongy caoutchouc.

7. An apparatus as claimed in claim 2, wherein said base is a band formed of a polyester resin.

8. An apparatus as claimed in claim 2, wherein said base is transparent.

9. An apparatus as claimed in claim 2 comprising a support member facing said elastic member on the opposite side of said base, an endless band engaging between said support member and said base, and means for advancing said base and said endless band in synchronism.

References Cited

The following references, cited by the Examiner, are of record in the patented file of this patent or the original patent.

UNITED STATES PATENTS

| | | | |
|---|---|---|---|
| 1,706,046 | 3/1929 | Tisdale | 35—61 |
| 2,098,689 | 11/1937 | Masson | 346—44 |
| 2,148,917 | 2/1939 | Von Heinrich | 101—168 |
| 2,312,623 | 3/1943 | Brooks et al. | 35—66 |
| 2,807,891 | 10/1957 | Roscoe | 118—106 |
| 3,084,457 | 4/1963 | Schott | 35—66 |
| 3,358,149 | 12/1967 | Preikschat | 346—21 |
| 3,309,989 | 3/1967 | Solhelm | 197—149 |

EDGAR S. BURR, Primary Examiner

U.S. Cl. X.R.

35—61; 197—168, 181; 118—253; 346—21